United States Patent

[11] 3,629,927

[72] Inventors Melvin J. Palmer
Huntington Park;
Michael A. Seitz, Whittier, both of Calif.
[21] Appl. No. 23,613
[22] Filed Mar. 30, 1970
[45] Patented Dec. 28, 1971
[73] Assignee Byron Jackson, Inc.
Long Beach, Calif.

[54] MOUSE HOLE CHUCK
15 Claims, 15 Drawing Figs.

[52] U.S. Cl.................................................... 29/240,
81/57.34
[51] Int. Cl..........................................B23p 19/04,
B25b 21/00
[50] Field of Search............................ 29/237,
240; 81/57.34, 57.33, 57.35, 57.16, 57.15, 57.19

[56] References Cited
UNITED STATES PATENTS
| | | | |
|---|---|---|---|
| 2,453,369 | 11/1948 | Grable et al. | 81/57.34 |
| 2,871,743 | 2/1959 | Kelley | 81/57.34 |
| 3,505,913 | 4/1970 | Dickmann et al. | 81/57.34 |

*Primary Examiner*—Gil Weidenfeld
*Attorneys*—Donald W. Banner, William S. McCurry and John W. Butcher ABSTRACT: A chuck assembly for making up and breaking out threaded connections between a drill pipe single disposed in a mouse hole and a Kelly suspended above the mouse hole, in which a lower chuck subassembly is fixedly mounted at the top of the mouse hole, and an upper chuck subassembly is pivotally mounted on the lower chuck subassembly, a fluid pressure operated actuator being interconnected with the chuck subassemblies to effect pivotal movement of the upper chuck subassembly, the chuck subassemblies respectively having opposing jaws actuatable into gripping engagement with the joint part at the upper end of the single of drill pipe and at the lower end of the Kelly saver sub to effect rotation of one joint part relative to the other upon angular movement of the upper chuck subassembly. Such a mouse hole chuck in which a centering device engages the pipe to substantially center its tool joint part with respect to the axis of relative rotation of the chuck subassemblies.

INVENTORS.
MELVIN J. PALMER
MICHAEL A. SEITZ
BY
John O. Evans, Jr.
ATTORNEY

INVENTORS.
MELVIN J. PALMER
MICHAEL A. SEITZ
BY
John O. Evans, Jr.
ATTORNEY

INVENTORS.
MELVIN J. PALMER
MICHAEL A. SEITZ
BY John O. Evans, Jr.
ATTORNEY

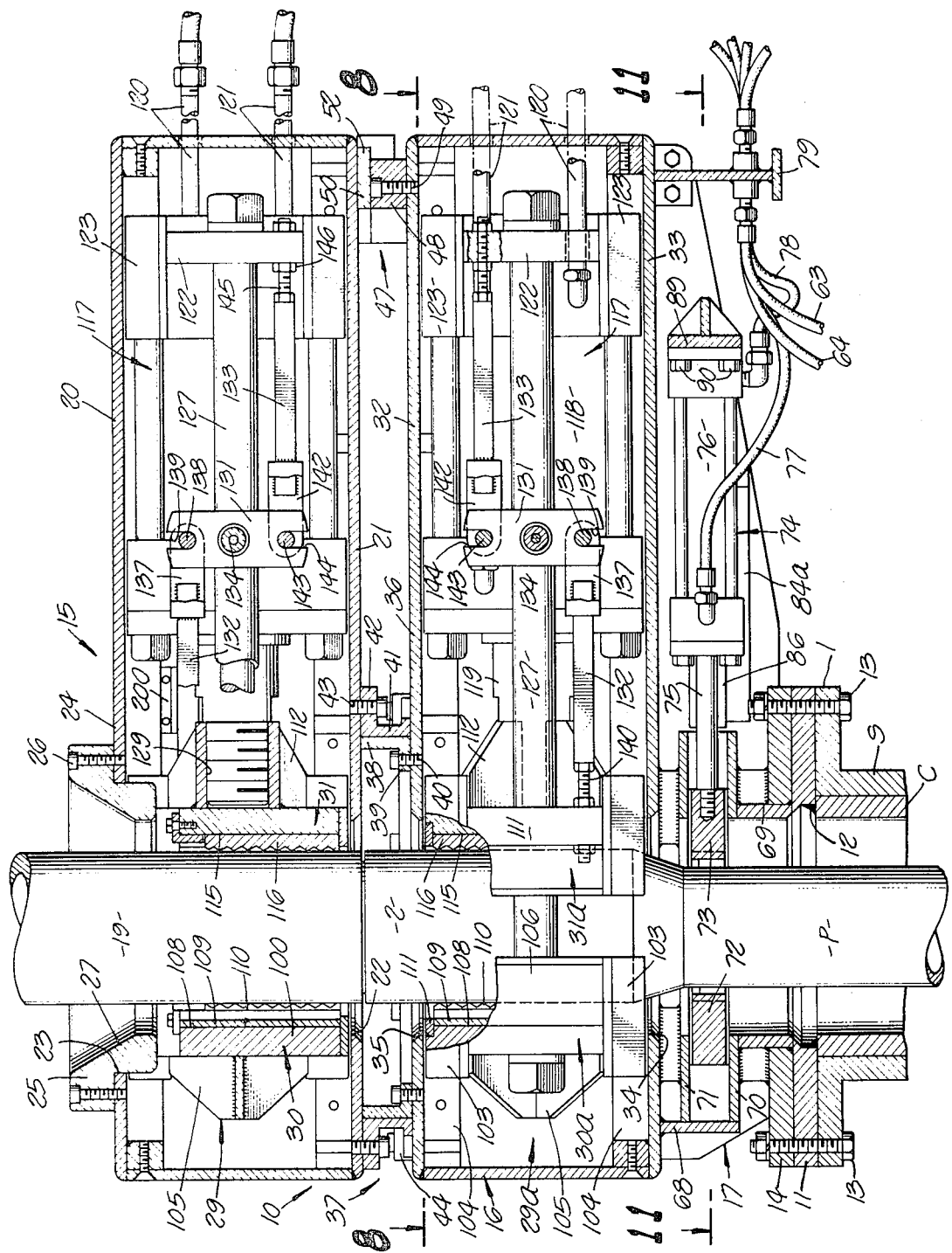

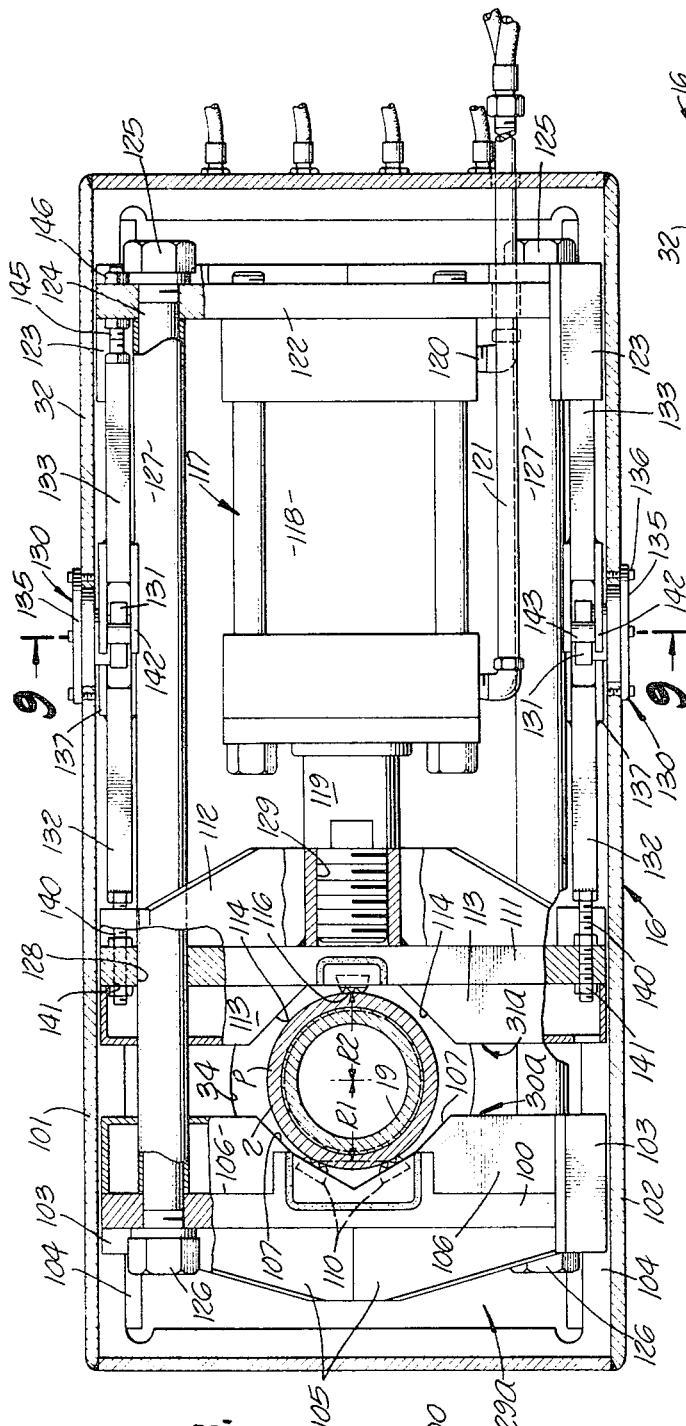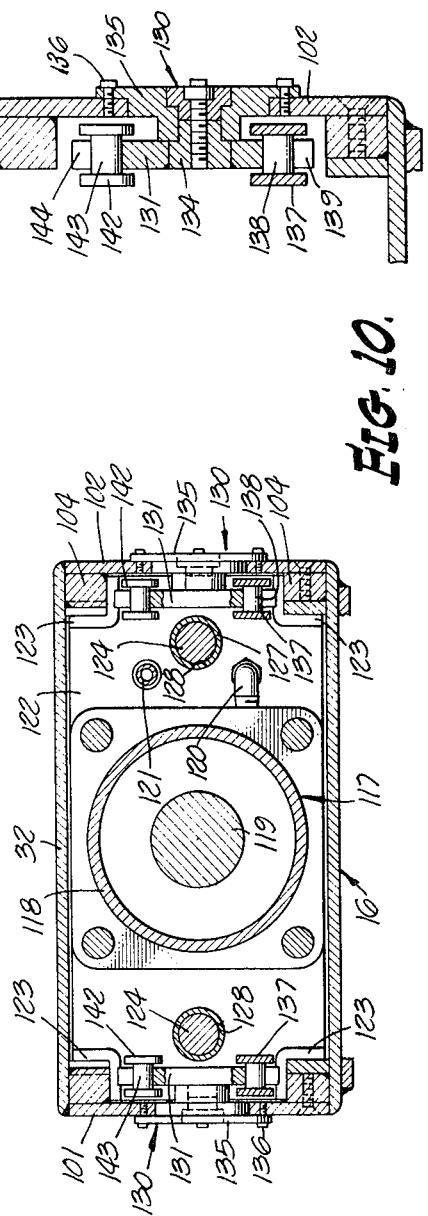

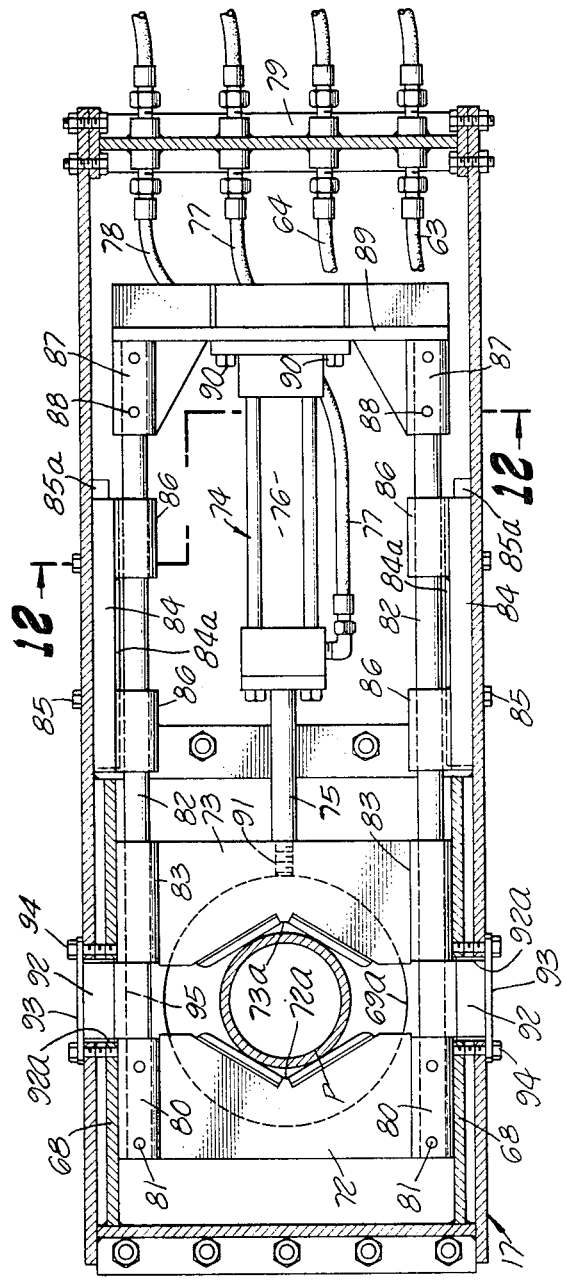
Fig. 11.
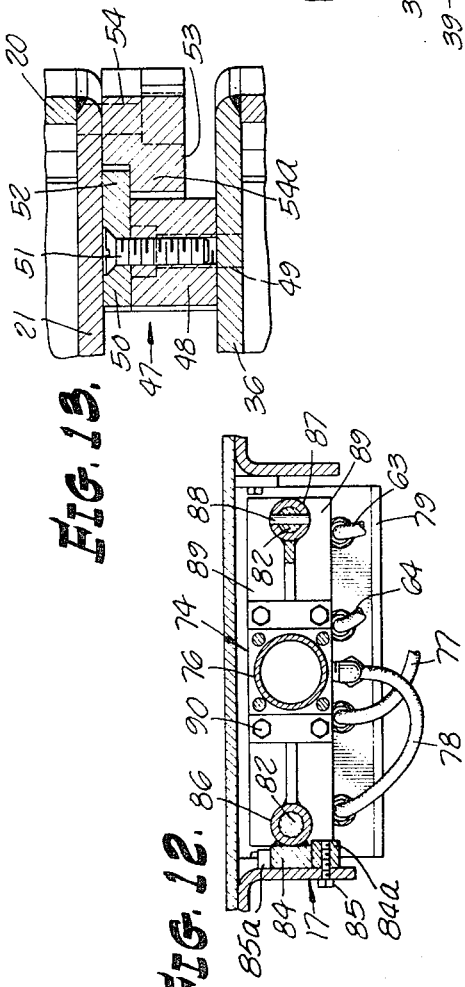
Fig. 13.
Fig. 12.
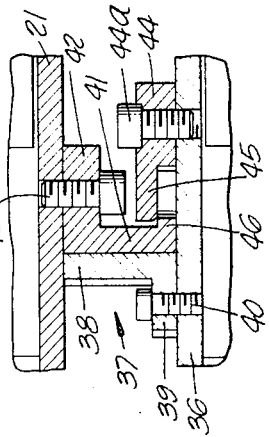
Fig. 14.
INVENTORS.
MELVIN J. PALMER
MICHAEL A. SEITZ
BY
John O. Evans, Jr.
ATTORNEY

MOUSE HOLE CHUCK

BACKGROUND OF THE INVENTION

The modern day rigs employed in the rotary drilling of wells, such as oil and/or gas wells, generally employ a Kelly, a length of square pipe, which is connected to the upper end of the drill pipe string and rotated by the Kelly drive bushing when the rotary table is rotated, the Kelly sliding progressively downwardly through the drive bushing as the drilling progresses. When the Kelly has moved downwardly a distance substantially equal to a single length of drill pipe, usually 30 feet, it is necessary to disconnect the Kelly from the upper end of the drill string and to reconnect the Kelly to an additional signal length of pipe which is then connected to the upper end of the drill string to allow for further downward progression of the drilling operation.

In order to facilitate and expedite the successive connection of the singles of drill pipe to the Kelly, the singles are successively stored in a so-called "mouse hole" which is located at one side of the derrick or floor of the drilling platform enabling the Kelly, supported by the usual traveling block and swivel, to be swung off to a position substantially aligned with the single of drill pipe in the mouse hole to enable connection of the Kelly to the single. Such a connection generally involves the use of means for effecting relative rotation of the Kelly and the single so as to makeup the threaded joint. The drill pipe is typically provided with a tool joint part of enlarged diameter adapted to be engaged by a spinning chain or the gripping dies of tonging or wrenching devices, and at the lower end of the Kelly there is generally provided a Kelly saver sub having a complemental joint part adapted to be engaged by tonging or wrenching devices. While it is common to employ so-called Kelly spinners to effect rotation of the Kelly relative to the singles of pipe to the mouse hole for effecting the initial connection of the threaded joint parts, it is necessary that following the spinning of the Kelly by the Kelly spinner, relatively high torque must be applied to the Kelly to finally make up the threaded joint. Various tong devices have heretofore been provided for effecting such high torque angular movement of the Kelly, but such devices have not been altogether satisfactory in respect to facilitating and expediting the making up of such joints.

If so-called hand tongs are employed on the rig for making up the drill pipe string as the drill string is being round tripped then such hand tongs can conveniently be employed to make up the joint between the Kelly, or more particularly, the Kelly saver sub, and a single of drill pipe in the mouse hole. However, with the advent of power operated pipe tongs which are located at the top of the well bore for making up and breaking out the pipe, and particularly where various automated pipe handling operations are contemplated, the need for power operated equipment for making up the joint between the Kelly and a single of drill pipe in the mouse hole has become more pronounced.

SUMMARY OF THE INVENTION

The present invention provides a mouse hold chuck mounted at the top of the mouse hole and adapted to hold the single of pipe stationary in the mouse hole, as the Kelly, driven by the Kelly spinner or otherwise, is initially threadedly connected to the stationary single of pipe, following which the Kelly is moved angularly by the application of high torque thereto to finally make up the threaded connection, or, if necessary, to initially break out such a connection, whereby the connection of the Kelly to pipe singles during a drilling operation is substantially facilitated and expedited.

More particularly, the present invention involves the mounting of a stationary chuck subassembly at the top of the mouse hole, such subassembly including gripping jaws actuatable between an open position allowing a single of drill pipe to be lowered into the mouse hole and a closed position at which the jaws grip the single of pipe to hold the latter against rotation, there being mounted on the stationary subassembly another subassembly shiftable angularly by an actuator interconnected between the subassemblies, and also including a pair of gripping jaws movable between an open position at which the single of pipe may pass therethrough and the lower end of the Kelly may engage the tool joint of the drill pipe single, and a closed position at which the latter jaws are adapted to grip the Kelly, or the Kelly saver sub forming a part of the Kelly, or the Kelly saver sub forming a part of the Kelly, as the subassemblies are actuated angularly, one relative to the other, to finally make up the joint between the Kelly and the single of drill pipe.

In addition to the foregoing, the invention provides a centering device engageable with the upper end of a single of drill pipe in the mouse hole to centralize the tool joint at the upper end of the single within the gripping mechanism or jaws of the stationary gripping subassembly at the top of the mouse hole, so as to facilitate the stabbing of the lower end of the Kelly or Kelly saver into the upper end of the single of drill pipe.

Furthermore, the invention provides a mouse hole chuck assembly in which a fixed gripping subassembly has an angularly movable subassembly shiftably supported thereon, and wherein each of the gripping subassemblies has gripping jaws which are stabilized on substantially a common center which is coincident with the axis of angular movement of the shiftably subassembly.

An object of the invention is to provide a mouse hole chuck which is effective in its operation, is durable, and easy to operate.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

BRIEF DESCRIPTION OF THE DRAWINGS

FIG. 7 is a view generally corresponding to FIG. 6, but showing the gripping jaws of the subassemblies respectively engaged with the tool joint part of the single and with the joint part of the Kelly saver sub;

FIG. 8 is a view in horizontal section; as taken on the line 8—8 of FIG. 7;

FIG. 9 is a view in transverse section, as taken on the line 9—9 of FIG. 8;

FIG. 10 is a fragmentary detail view in vertical section, showing a typical mounting for a jaw positioning crank in the single and Kelly gripping subassemblies;

FIG. 11 is a view in horizontal section, as taken on the line 11—11 of FIG. 7, showing the single centralizing mechanism;

FIG. 12 is a view in transverse section, as taken on the line 12—12 of FIG. 11;

FIG. 13 is an enlarged fragmentary detail view in section, as taken on the line 13—13 of FIG. 4;

FIG. 14 is an enlarged fragmentary detail view in section, as taken on the line 14—14 of FIG. 4; and FIG. 15 is an enlarged fragmentary detail view in section, as taken on the line 15—15 of FIG. 6.

DESCRIPTION OF THE PREFERRED EMBODIMENT

Figure 1:
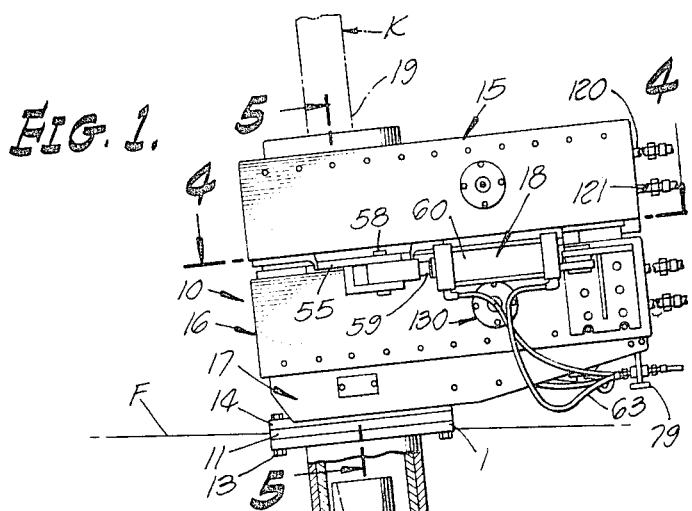
FIG. 1 is a view partly in side elevation and partly in vertical section, showing a mouse hole chuck in accordance with the invention; installed at the top of a mouse hole of a well drilling rig, with a single of drill pipe in the mouse hole and a Kelly saver sub shown in broken lines as extending into the chuck.
Figure 5:
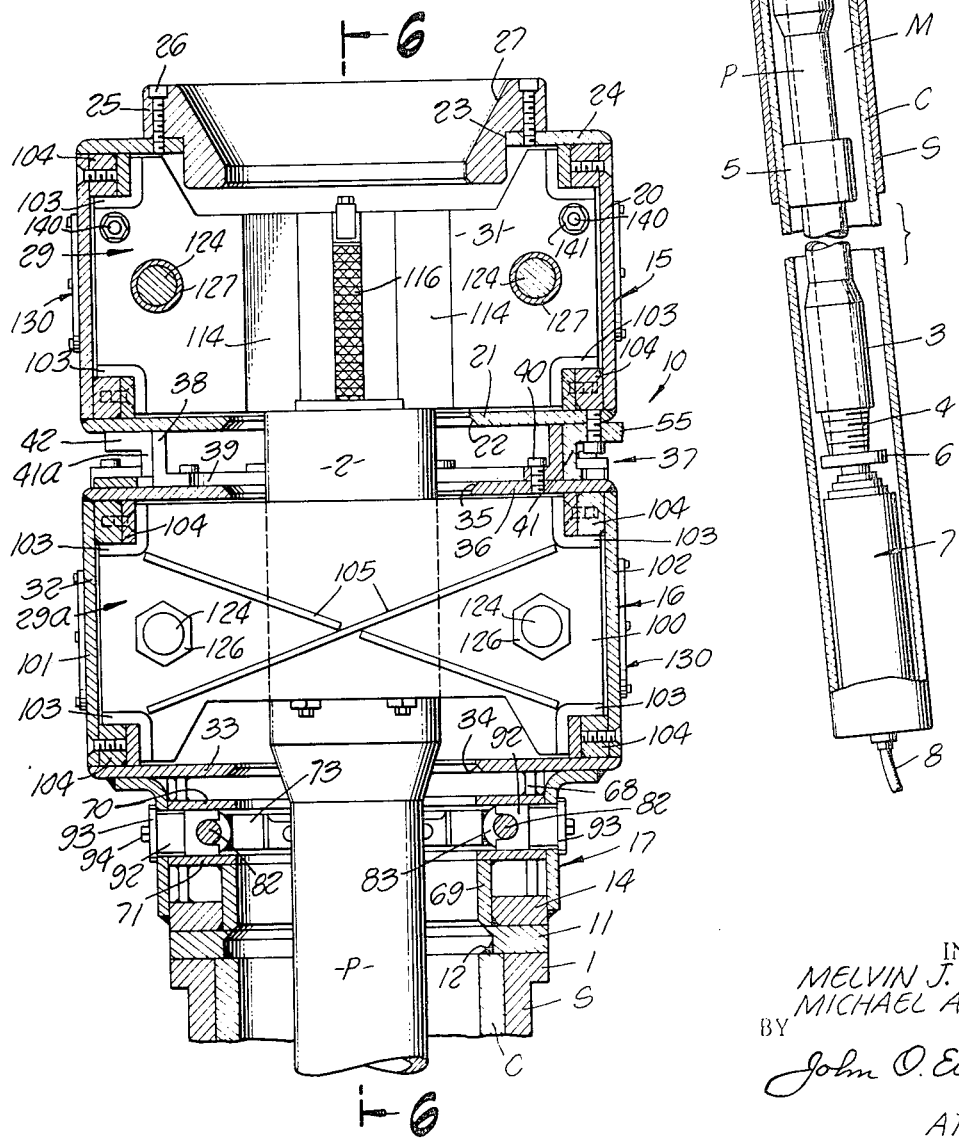
FIG. 5 is an enlarged view in substantially vertical section, as taken on the line 5–5 of FIG. 1, with the outer jaw of the single gripping means of the lower subassembly shown in elevation, and with the single elevated into engagement with the closed jaws of the Kelly gripping subassembly.

As seen in the drawings, a mouse hole M is provided by a conductor pipe C which extends downwardly below the floor F of a well drilling rig, the floor F being part of a typical land based drilling rig or part of a seagoing vessel. In either event, the conductor pipe C extends downwardly through a scabbard S having an upper end flange 1, the flange 1 and the scabbard S being fixed with relation to the floor F so that the conductor pipe C extends downwardly at a small angle relative to a vertical plane. The scabbard S and the conductor pipe C which form the mouse hole M are well known and form no part of the present invention, and such a mouse hole arrangement is typically employed to store singles of drill pipe P preparatory to connecting the single to a Kelly. Illustratively, the pipe P is shown as having an upper tool joint part 2 in the form of an internally threaded box and at its lower end the single of pipe P has another tool joint part 3 including the usual threaded pin 4. Intermediate its ends, the pipe P may have one or more protectors thereon constituted by annular resilient bushings 5. At its lower end, the pipe P is shown as resting on a plate 6 forming a part of a telescopic jack assembly 7 which is preferably of an hydraulic type, supplied with fluid through a conduit 8. This jack 7 forms no part of the present invention and may be employed in the mouse hold M for various purposes other than that hereinafter to be described, involving the need for raising or lowering or vertically positioning the pipe single P in the mouse hole M with relation to the floor F or such pipe handling apparatus as may be employed in the handling or the utilization of the single of pipe P.

Figure 6:
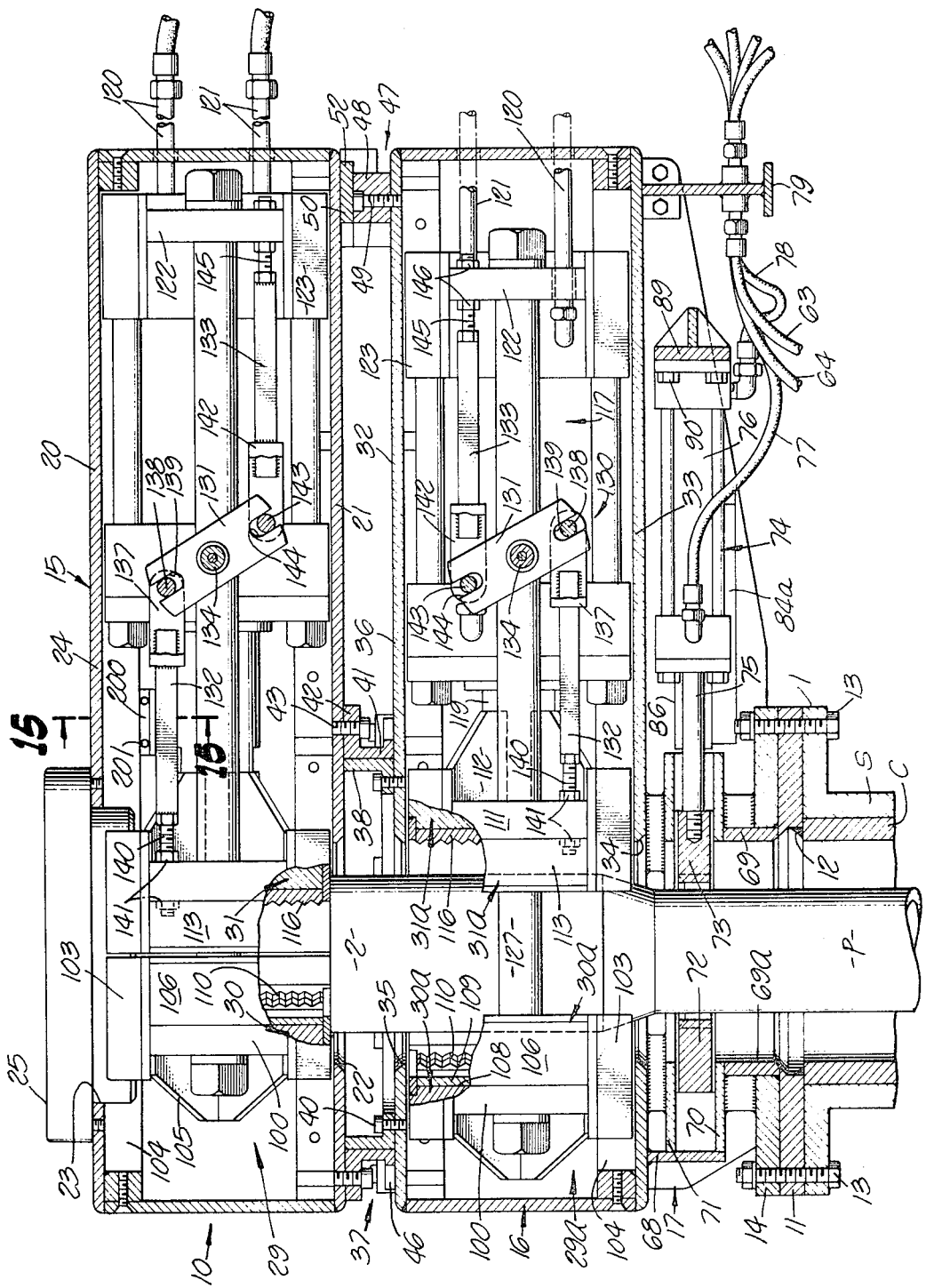
FIG. 6 is a view in vertical section, as taken on the line 6—6 of FIG. 5.

The present invention involves the provision of the mouse hole chuck assembly, generally denoted at 10, which is affixed to the floor F, or more specifically as shown, to the flange 1 at the top of the scabbard S. As seen in FIGS. 1 and 6, the conductor pipe C has an upper flange 11 welded as at 12 to the conductor pipe C and connected to the flange 1 of the scabbard S by bolts 13 which also connect a base flange 14 of the mouse hole chuck assembly 10 to the stationary structure which provides the mouse hole M.

In general, the mouse hole chuck assembly comprises a number of subassemblies including an upper gripping subassembly 15 and a lower gripping subassembly 16. Below the gripping subassembly 16 is a centering subassembly 17. Means hereinafter to be more fully described, but including a fluid pressure operated actuator 18 are provided for effecting angular movement of the upper gripping subassembly 15 relative to the lower gripping subassembly 16 between the position shown in FIG. 2 and the position shown in FIG. 3, for the purpose of finally making up the usual threaded joint between the Kelly K, which is constituted by an elongated square conduit adapted to be rotated by the rotary table of the drilling rig as the Kelly slides downwardly through the usual Kelly drive bushing, and the pipe P, and it will also be understood that there is generally employed at the lower end of the Kelly, a Kelly saver sub, a portion of which is herein designated at 19.

In general, it is the function of the present invention to hold the pipe single P in the lower gripping subassembly 16 while the Kelly K is rotated to make up the usual threaded connections between the Kelly saver sub 19 and the pipe single P. Initially, the Kelly K may be rotated by any suitable means (not shown) during the making up of such joint, such as, for example, by means of the usual spinning chain or by a power operated Kelly spinner. Following the initial make up of the threaded connection between the Kelly K and the pipe single P, the present invention functions to grip the Kelly saver sub 19 in the upper gripping subassembly 15 as the latter is moved angularly by the actuator means 18, from the position shown in FIG. 2 to the position shown in FIG. 3, so that the threaded connection will be finally madeup or torqued.

Figure 2:
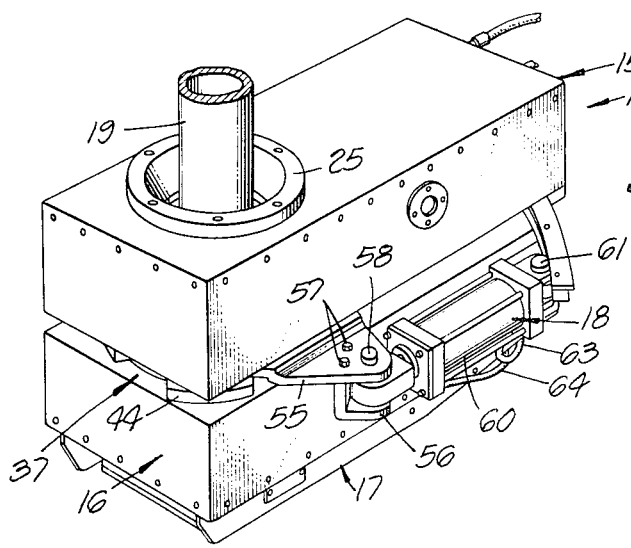
FIG. 2 is a perspective of the mouse hole chuck, with the gripping subassemblies in one angular relationship.
Figure 3:
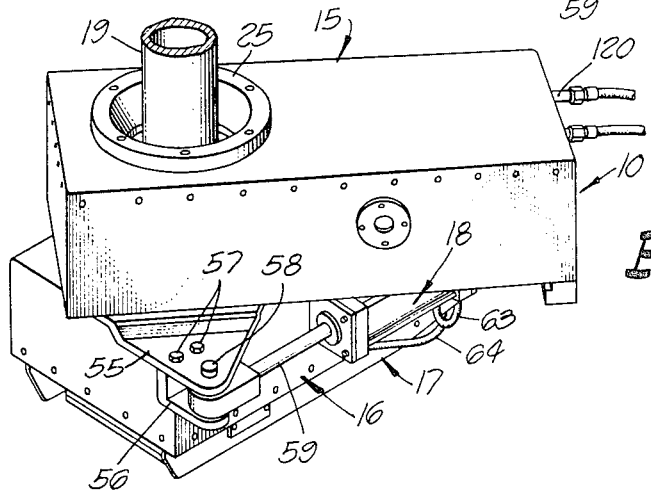
FIG. 3 is a perspective of the mouse hole chuck, with the gripping subassemblies shown actuated in another angular relationship.

It will be apparent that under some circumstances, the upper gripping subassembly 15 may be moved from the position shown in FIG. 3 to the position shown in FIG. 2 in order to initially breakout the threaded connection between the Kelly saver sub 19 and the pipe single P.

The respective gripping subassemblies 15 and 16 are substantially identical. The upper subassembly 15 comprises a housing or case structure 20 having a bottom wall 21 having an opening 22 therethrough coaxial with an opening 23 in the top wall 24. Disposed in the opening 24 is a guide ring 25 which is secured to the wall 24 by fasteners 26 and has a downwardly convergent tapered guide surface 27 for guiding the lower end of the pipe P OR THE Kelly saver 19 into the subassembly. Gripping means 29 are included in the gripping subassembly 15, including opposing jaws 30 and 31 adapted to be relatively shifted between open positions allowing the passage of the pipe P therethrough and closed positions so as to be engageable by the upper end of the pipe P (FIG. 6) or in gripping engagement with the Kelly saver 19 (FIG. 7).

Correspondingly, the lower gripping subassembly 16 comprises a housing or case structure 32, the bottom wall 33 of which has an opening 34 aligned with an opening 35 in the upper wall 36. Gripping means 29a are included in the gripping subassembly 16, including opposing jaws 30a and 31a adapted to be shifted between open positions (FIG. 6) allowing the passage of a pipe P therethrough and closed positions in gripping engagement with the tool joint part 2 of the pipe P (FIG. 7).

Figure 4:
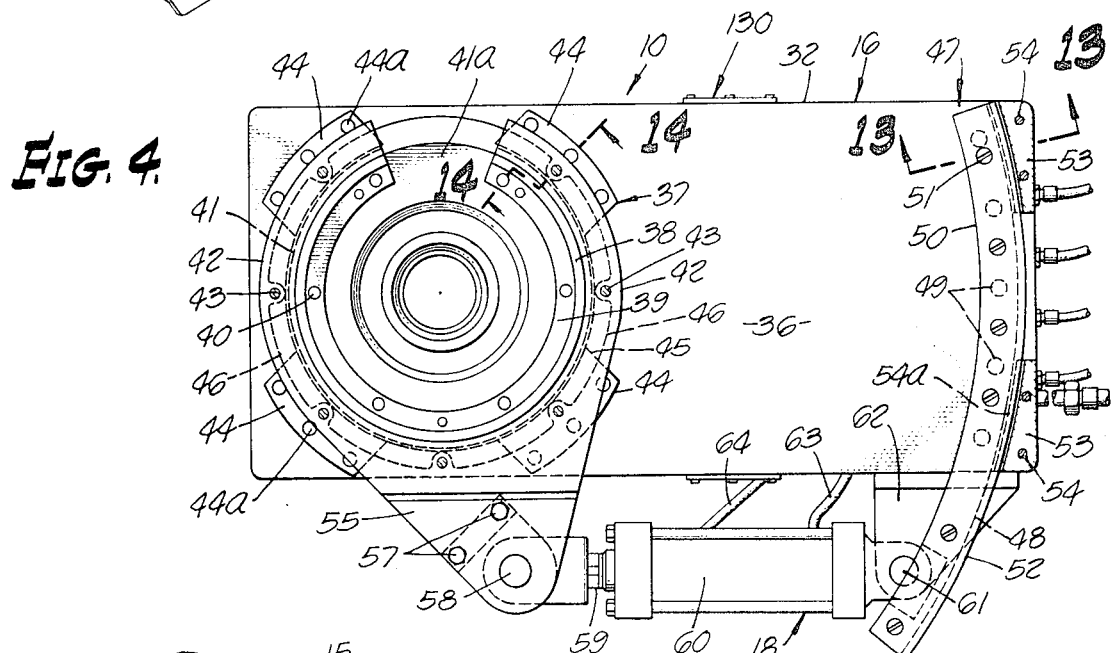
FIG. 4 is an enlarged view in substantially horizontal section, as taken on the line 4—4 of FIG. 1.

Means 37 are provided for mounting the upper case 20 on the lower case 32 for relative pivotal movement about an axis coincident with the axis of the aligned openings 22 and 23 in the upper case 20 and the aligned openings 34 and 35 in the lower case 32. Such means 37, best seen in FIGS. 4, 6, 7 and 14, includes a cylindrical ring member 38 having an inturned flange 39 at its lower end connected by fasteners 40 to the top wall 36 of the lower case 32 in concentric relation to the opening 35 in the latter wall, and an outer cylindrical ring member 41 disposed about the ring 38 and having an upper end flange 42 fastened by fasteners 43 to the bottom wall 21 of the upper case 20 in concentric relation with the opening 22 in the latter wall. The outer cylindrical ring 41 fits about the ring 38, so that the rings 38 and 41, together, maintain coaxial alignment of the case openings 22 and 35. In order to hold the rings 38 and 41, and hence the cases 20 and 32, against separation, a suitable number of arcuate cleats or plates 44 are fastened by fasteners 44a to the top wall 36 of the lower case 32 and provide flanges 45 which overly an outstanding flange 46 at the lower end of the cylindrical ring 41. The ring 41 and the flange 42 are preferably split to provide a side window 41a, as seen in FIG. 4, whereby visual inspection may be made when joints are being madeup, as will be later described.

At the other end of the cases 20 and 32 from their pivotal mounting means 37, are means 47 for holding the cases against cocking and binding the rings 38 and 41, such means 47 being best seen in FIGS. 4, 6, 7, and 13. An arched base member 48 is secured by fasteners 49 to the top wall 36 of the lower case structure 32, an arched rail 50 being fastened by fasteners 51 to the base member 48 to provide an outstanding flange 52, and the lower wall 21 of the upper case structure 20 has a pair of laterally spaced cleats 53 secured thereto by fasteners 54 and providing flanges 54a which slidably engage the arcuate flange 52 to prevent cocking of the cases 20 and 32 relative to the axis of rotation defined by the pivotal mounting means 37.

In order to effect pivotal movement of the upper case 20 relative to the lower case section 32 about the pivotal mounting 37, the flange 42 is provided with a crank arm 55 projecting outwardly therefrom. Adjacent to its outer end, the crank arm 55 has a bracket 56 connected thereto by fasteners 57 to enable connection, by a pin 58, of the actuator rod 59 of the fluid pressure operated actuator 18 to the crank arm 55. The cylinder 60 of the actuator 18 is connected by a pin 61 to a bracket 62 which is suitably affixed to the lower case structure of the chuck assembly. As will be understood, the actuator 18 is double-acting, and has a pair of conduits 63 and 64 leading from a suitable source of fluid under pressure, whereby extension and retraction of the actuator rod 59 will effect movement of the upper case 20 about the pivotal mounting means 37 between the position shown in FIG. 3, so as to rotate a Kelly saver sub 19 in the gripping means 29 of the upper gripping subassembly 15, while the gripping means 29a of the lower gripping subassembly 16 as will be hereinafter described, holds the tool joint or box portion 2 of the pipe against rotation.

The pipe centering means 17 is best seen in FIGS. 6, 7, 11 and 12, and is adapted to center the pipe P with respect to the openings 34 and 35 in the lower case 32 and hence with respect to the axis of rotation of the upper Kelly gripping subassembly 15 relative to the lower pipe gripping subassembly 16. This centering means 17 includes a frame structure 68 which is fixed on the flange or plate 14. More particularly, a cylindrical sleeve 69 extends into a central opening in the attachment plate 14 is is welded or otherwise suitably connected to the bottom wall 70 of the frame structure 68, and the upper wall 71 of the frame structure 68 is welded or other wise suitably affixed to the lower wall 33 of the lower gripping subassembly case 32. Various modes of fixedly mounting the centering means 17 at the top of the mouse hole M may be resorted to other than the weldments herein illustrated, and therefore there is no need for further specific description or illustration herein. The significant point is that the frame structure supports a pair of opposed centering pads 72 and 73 for movements between positions at which the pads 72 and 73 are separated to allow movement of the pipe P therethrough, and at which the pads 72 and 73 are moved toward one another to essentially centralize the upper end or tool joint 2 of the pipe P with respect to the axis of rotation of the upper gripping subassembly 15 relative to the lower gripping subassembly 16.

Referring to FIG. 11 more particularly, the frame structure 68 of the centering means 17 will be seen to include a fluid pressure operated actuator 74 having a rod 75 connected to the pad 73 and a cylinder 76 connected to the pad 72 for moving the pads 72 and 73 toward and away from one another. Operating fluid is supplied to the cylinder 76 through either of a pair of conduits 77 and 78 leading from a fluid connector bar 79 at the rear end of the frame structure 68, so that the actuator 74 is double acting.

The pad 72 extends transversely of the frame structure 68 and has sleeves 80, 80 which are welded or otherwise affixed at its opposite ends, the sleeves being pinned as at 81 to elongated connector rods 82 which extend longitudinally in the frame structure 68 at opposite sides thereof. These rods 82 slidably extend through sleeves 83, 83 which are welded or otherwise affixed to the opposite ends of the centering pad 73. Supporting the rods 82, and hence the pads 72 and 73 for relative sliding movement, is a pair of support plates 84, 84 which are disposed adjacent to the side walls of the frame structure 68 and rest upon blocks 84a which are connected to the sidewalls by fasteners 85. The blocks 84a have upstanding ends 85a holding the plates 84 against sliding movement on the blocks 84a in one direction, the plates 84 being limited against sliding in the other direction by abutting with the frame structure 68. Welded or otherwise affixed to the plates 84 are spaced bearing or support sleeves 86 through which the rods 82 slidably extend. At the ends of the rods 82 remote from the pads 72 and 73, the rods are connected in sleeves 87, 87 by pins 88, or the rods are otherwise rigidly connected to a rear plate or yoke 89. The actuator cylinder 76 is connected by fasteners 90 to the yoke 89, and the piston rod 75, as previously indicated, is connected at 91 to the centering pad 73. It will now be apparent that the centering pads 72 and 73 are relatively movable towards and away from one another in response to expansion or contraction of the actuator 74.

Locating means are provided to limit movement of the pads 72 and 73 towards one another and to centralize the pads with respect to the axis of the opening 69a through the member 69 which is coincident with the axis of rotation of the upper gripping subassembly 15 relative to the lower gripping subassembly 16. Such locating means includes a pair of blocks 92 on plates 93 which are connected to the sides of the frame structure 68 by fasteners 94. The blocks 92 extend inwardly through enlarged openings 92a in the frame structure 68 and are slotted, as at 95, so as to allow free movement of the rods 82 therethrough, and project into the gap between the sleeves 80 of centering pads 72 and the sleeves 83 of the centering pads 73, so as to limit movement of the pads 72 and 73 towards one another to positions at which the pads are positioned to centralize the pipe P. In this connection, the pad 72 has oppositely inclined surfaces defining a V-shaped seat 72a, and the pad 73 has corresponding inclined surfaces defining a seat 73a, whereby, essentially, a quadrilateral opening is defined between the pads 72 and 73 in which pipes of various sizes are substantially centered. In order to accommodate pipes P of different diameters, the stop blocks 92 are readily replaceable with blocks of different sizes or widths, so as to vary the maximum movement of the pads 72 and 73 towards one another.

With the upper end of the single P substantially centralized within the openings defined by the chuck assembly, the Kelly saver sub 19 may be readily stabbed into the tool joint 2, spun up relative to the pipe P, when the latter is gripped in the lower gripping subassembly 16, and finally torqued when the sub 19 is gripped in the upper gripping subassembly 15 and the latter is actuated angularly by the actuator means 18.

The gripping means 29 and 29a of the subassemblies 15 and 16 will now be described, with particular reference to the lower subassembly 16, as seen in FIGS. 5 through 10, it being understood, as indicated above, that the upper gripping subassembly 15 is substantially the same as the lower gripping subassembly 16.

The jaw 30a of the gripping means 29a includes a plate or body 100 which extends transversely between the sidewalls 101 and 102 of the case structure 32. At its corners, the plate or body 100 is provided with angle members 103 adapted for free sliding movement along corner rails 104 which are provided in and extend longitudinally of the case structure 32. The body 100 may be reinforced by suitable members 105 which are welded to the outer side of the jaw body 100. On the inner side of the jaw body are hollow body members 106 having outwardly divergent surfaces 107, and centrally of the body 100 is slot 108 adapted to receive a die carrier 109 (FIGS. 6 and 7) in which are toothed dies 110 for engaging a pipe tool joint. Illustratively, there are two dies 110 spaced laterally of the center of the die carrier for engagement with the joint at angularly spaced locations. Such dies and carriers are well known in the oil tool field and need no further description herein.

The jaw 31a, like the jaw 30a, also includes a body o r plate 111 adapted for sliding movements on the corner rails 104. This inner jaw body may also be reinforced, as at 112 and provided with hollow parts 113 having divergent surfaces 114. The surfaces 114 form with the opposing surfaces 107 of the jaw 30a, a quadrilateral opening for the pipe joint part 2. In the jaw 31a is a slot 115 for the usual toothed die 116, this die forming with the dies 110 of the jaw 30a triangularly related points of contact for effectively centering the pipe joint 2 therebetween.

In order to actuate the jaws 30a and 31a towards and away from one another, a fluid pressure operated actuator 117 is provided in the case 32, including an actuator cylinder 118 and a rod 119 which is extensible and retractable upon the application of pressure fluid through respective conduits 120 and 121. The outer end of the cylinder 118 is provided with a yoke or plate 122, the corners of which are notched or provided with angle members 123 which are slidable longitudinally in the case 32 on the corner rails 104. A pair of tie rods 124 are connected by nuts 125 to the yoke 122 and extend longitudinally of the case 32 for connection to the outer jaw 30a by nuts 126. These tie rods 124 each have a spacer sleeve 127 thereon, the ends of which effectively provide abutments engageable with the yoke 122 and the body 100 of the outer jaw 30a to maintain the spacing therebetween. The inner jaw 31a has openings 128 through which the sleeves 127 freely and slidably extend. The tie rods 124, the sleeves 127, and the yoke 122 effectively interconnect the jaw 30a to the actuator cylinder 118 for unitized movement. On the other hand, the actuator rod 119 is connected to the inner jaw 31a, as at 129, so that the jaw 31a moves with the rod 119. Thus, the jaws 30a and 31a are adapted for relative movements towards and away from one another in response to extension and retraction of the actuator means 117, respectively.

While the actuator means 117 will effect equalization of the gripping of the tool joint 2 between the jaws 30a and 31a following engagement therewith, means 130 are provided for normally positioning the jaws 30a and 31a with respect to the case 32 so that the quadrilateral opening defined by faces 107 and 114 and, therefore, the dies 110 and 116, are initially positioned in substantially equally spaced relation to the axis of rotation of the upper gripping subassembly 15 relative to the lower gripping subassembly 16. This means 130 also substantially regulates the relative opening and closing movement of the jaws 30a and 31a so that they both move relative to the axis of rotation of the upper gripping subassembly the distance necessary to substantially simultaneously grip the pipe P on such axis. This means 130 will be best understood by reference to FIGS. 6 through 10.

More particularly, a pair of cranks or levers 131, 131 are pivotally mounted on the sidewalls 101 and 102 of the case 32, and each lever 131 has a link 132 connected to one end of the lever and to the inner jaw 31a, and a link 133 connected to the other end of the lever and to the yoke 122. The levers 131 are each provided, intermediate their ends with a hub 134 (FIG. 10) which is rotatably mounted in a bearing plate 135 affixed by fasteners 136 to a sidewall of the case 32. At one end of each link 132 is a connector 137 having a cross pin 138 which extends through an elongated slot 139 in the lever 131, and at the other end of each link 132 is a threaded end 140 connected by nuts 141 to the body 111 of jaw 31a. At one end of each link 133 is a connector 142 having a cross pin 143 which extends through an elongated slot 144 in the lever 131, and at the other end of each link 133 is a threaded end 145 connected by nuts 146 to the yoke 122, and hence through the tie rods 124 to the body 100 of jaw 30a.

It will now be appreciated that while relative movement of the jaws 30a and 31a in the case 32 is caused by extension and retraction of the actuator 117, the relationship of the jaws in the case is established by the point at which the levers 131 pivot, since such point locates the jaw assembly in the case 32. The levers 131 and links 132 and 133 determine or establish the positions of the jaws relative to the pivot point or the levers 131, so that the jaws are substantially equally spaced at opposite sides of a transverse plane extending between the jaws and intersecting the axis of rotation of the upper gripping subassembly 15 relative to the lower gripping subassembly 16 when the jaws are open as seen in FIG. 6.

Various die arrangements may require that the levers 131 have arms of different lengths so as to cause the major portion of the relative motion of the jaws effected by the actuator 117 to be transmitted to one of the jaws 30a and 31a. In the specifically illustrated embodiment, for example, the ends of the levers 131 to which links are connected are longer than the other ends of the levers 131, as is best been in FIG. 10. As a result the jaw 30a will move at a greater rate than the jaw 31a to compensate for the difference in the die arrangement in the jaws 30a and 31a. This difference is discernable in FIG. 8, wherein the length of the radius R1, from the center of the pipe P to a line extended between the dies 110 of the jaw 30a, is less than the length of the radius R2 extending to the die 116 of jaw 31a. If the dies were arranged the same in each jaw, then the effective lengths of the levers 131 should be equal.

The above description of the gripping and regulating structures in the upper gripping subassembly 16 will suffice, also, as a description of the gripping and regulating structures in the upper gripping subassembly 15, since as previously indicated the subassemblies are similar. It will be noted, however, that the subassemblies are similar. It will be noted, however, that the subassemblies are inverted with respect to one another. The same reference characters are therefore applied in both gripping subassemblies to designate the similar gripping and regulating structures.

In addition, while the slots 139 and 144 in the ends of the levers 131 have been shown as being open-ended, the slots may be closed, if desired. It has been found, when open-ended slots are employed, that a force may be imposed on a link, such as one of the links 132 connected between the levers 131 and the jaw connected to the actuator rod, namely jaw 31a or jaw 31, which force tends to cause the connecting pin 138 to be cammed out of the slot 139. Accordingly, one or more retainer brackets 200, as seen in FIGS. 6 and 15, may be employed to limit such undesired camming of the links. The brackets 200, only one of which is shown, may be suitably located and affixed to the case by fasteners 201.

OPERATION

In use, the apparatus described above operates as follows, to makeup joints between the Kelly saver sub 19 and a single of drill pipe P.

First, a single of drill pipe P, supported in the usual sling or other transfer apparatus, is lowered through the mouse hole chuck assembly into the mouse hole M until it rests upon the pad 6 of the hydraulic jack 7 at the bottom of the mouse hole, as seen in FIG. 1. It will be understood that in order to allow the pipe P to pass downwardly through the mouse hole chuck assembly, the jaws of the respective gripping means 29 and 29a will be fully open. Thereafter, the upper jaws 30 and 31 of the upper gripping subassembly 15 will be actuated to a fully closed position, as seen in FIG. 6, so that the jaws provide a stop in the opening 22, and the jack 7 is extended so as to elevate the pipe P to bring the upper end of the tool joint 2 into abutting engagement with the jaws 30 and 31. Thus, the jaws 30 and 31 also constitute stop means for limiting vertical movement of the pipe P to a position at which the tool joint 2 is adapted to be engaged by the jaws 30a and 31a of the gripping means 29a of the lower gripping subassembly 16. Preferably, the pipe P is slightly lowered by the jack 7 to the elevation shown in FIG. 7, at which the upper end of the tool joint 2 is spaced below the lower wall 21 of the upper gripping subassembly 15.

Next, fluid under pressure is supplied to the actuator 74 of the centering means 17, whereby to move the centering pads 72 and 73 towards one another to positions determined by the stops 92, at which positions the pads 72 and 73 cooperate to centralize the pipe P with the tool joint 2 disposed in the lower gripping subassembly 16 approximately coaxially with the axis of rotation of the upper gripping subassembly 15 relative to the lower gripping subassembly 16. With the pipe P thus centered, as seen in FIGS. 7 and 11, the lower gripping means 29a is actuated to close the jaws 30a and 31a on the tool joint 2, regulation of the relative movement of the jaws 30a and 31a being effected by the levers 131 and links 132 and 133 of the regulating or positioning means 130, whereby the jaws 30a and 31a close upon the tool joint 2 so as to hold the latter firmly and substantially coaxially disposed on the axis of rotation of the upper gripping subassembly 15 relative to the lower gripping subassembly 16.

With the pipe P this positioned and securely held, the Kelly K, including the Kelly saver sub 19, suspended by the usual derrick equipment, is stabbed into the tool joint 2 of the pipe single P and then rotated by conventional spinning means, which may be in the usual power operated Kelly spinner, until the Kelly saver sub 19 and the tool joint 2 shoulder, as shown in FIG. 7. Then, as also shown in FIG. 7, the gripping means 29 of the upper gripping subassembly 15 are actuated to the closed positions to grip the Kelly saver sub 19, also substantially on the axis of rotation of the upper gripping subassembly 15 relative to the lower gripping subassembly 16. With the Kelly saver sub 19 and the tool joint 2, respectively gripped securely by the upper gripping means 29 and the lower gripping means 29a, fluid under pressure may be supplied to the actuator means 18 to effect angular movement of the subassembly 15 from the position shown in FIG. 2 to the position shown in FIG. 3, so as to apply final make up torque to the threaded connection between the pipe P and the Kelly K.

Following the final makeup operation, both of the gripping means 29 and 29a are opened and the centering means 17 is opened, so that the Kelly with the pipe single P connected thereto can be elevated to lift the pipe P from the mouse hole M to enable its connection to the upper end of the well drilling string disposed in the well bore. The actuator means 18 may be retracted to return the upper gripping subassembly 15 to the position shown in FIG. 2 at any time after the gripping means 29a have been opened. In addition, it will be understood that if necessary the upper gripping subassembly 15 can be cycled to the position of FIG. 3 a second time, if this is found to be necessary in order to finally make up the joint between the Kelly K and the pipe single P.

Moreover, in the event that it is desired to disconnect the Kelly saver sub 19 from a single P in the mouse hole M, it is only necessary to actuate the upper gripping subassembly 15 to the position shown in FIG. 3 and to, thereafter, close the gripping means 29 on the Kelly saver sub 19 and the gripping means 29a on the tool joint 2, whereby the retraction of the actuator means 18 will apply breakout torque to the Kelly saver sub 19. Such breakout of the joint is usually necessary only if the joint is cross-threaded, or if, for some reason, it is determined that a pipe single P, which has been connected to the Kelly, is not to be used in the drill string.

We claim:

1. In apparatus for threadedly connecting a Kelly to a length of drill pipe in a mouse hole below the floor of a well drilling rig, a mouse hole chuck assembly, mounting means for supporting said assembly at the top of the mouse hole, said chuck assembly including a lower pipe gripping subassembly having gripping means operable to releasably grip the upper end of said pipe, an upper gripping subassembly having gripping means operable to releasably grip the lower end of said Kelly, means pivotally mounting said upper gripping subassembly on said lower gripping subassembly for pivotal movement about an axis extending through said gripping means, means for relatively pivotally moving said upper gripping subassembly and said lower gripping subassembly about said axis, and said mouse hole chuck assembly including centering means beneath said lower gripping subassembly for positioning said pipe substantially on said axis.

2. In apparatus as defined in claim 1, each of said gripping means including a pair of gripping jaws spaced on opposite sides of said axis in opposed relation to one another, and means for moving said jaws toward and away from one another.

3. In apparatus as defined in claim 1, each of said gripping means including a pair of gripping jaws spaced on opposite sides of said axis in opposed relation to one another, means for moving said jaws towards and away from one another, and regulating means connected to said jaws for holding said jaws substantially equally spaced relative to said axis during movement of said jaws.

4. In apparatus as defined in claim 1, said centering means including a frame structure, a pair of pads slidable in said frame structure towards and away from one another at opposite sides of said axis, said frame having stop means for limiting movement of said pads towards and away from said axis, and actuator means for shifting said pads into engagement with said stop means to position said pipe substantially on said axis.

5. In apparatus as defined in claim 4, said stop means comprising blocks at opposite sides of said frame structure and centered with respect to a transverse plane intersecting said axis.

6. In apparatus, as defined in claim 4, said stop means comprising blocks at opposite sides of said frame structure and centered with respect to a transverse plane intersection said axis, and means removably mounting said blocks on said frame structure, whereby blocks of different sizes mounted on said frame structure vary the distance between said pads to accommodate pipe of different sizes.

7. In apparatus as defined in claim 1, said centering means including a frame structure, a first centering pad and a yoke spaced apart in said frame structure, a pair of tie rods interconnecting said first centering pad and said yoke, means slidably supporting said tie rods on said frame structure, a second centering pad, means slidably supporting said second centering pad on said tie rods, and actuator means interposed between said yoke and said second centering pad to move said pads toward and away from one another.

8. In apparatus as defined in claim 7, said actuator means including a pressure operated cylinder and rod, said cylinder being connected to one and said rod being connected to the other of said yoke and said second pad.

9. In apparatus as defined in claim 1, each of said gripping subassemblies including a frame structure, each of said gripping means including a first jaw and said yoke, tie rods interconnecting said first jaw and said yoke, a second jaw slidable with respect to said tie rods, means supporting said jaws and said yoke for movement of said jaws in said frame structure towards and away from another, and actuator means between said yoke and said second jaw for moving said jaws.

10. In apparatus as defined in claim 9, said actuator means including a pressure operated cylinder and rod, said cylinder being connected to one and said rod being connected to the other of said yoke and said second jaw.

11. In apparatus as defined in claim 9, regulator means connected to said case and to said yoke and said second jaw for positioning said jaws in substantially equally spaced opposed relation at opposite sides of the axis of relative angular movement of said gripping subassemblies.

12. In apparatus as defined in claim 9, regulator means connected to said case and to said yoke and said second jaw for positioning said jaws in substantially equally spaced opposed relation at opposite sides of the axis of relative angular movement of said gripping subassemblies, said regulating means including a pair of levers, means pivotally mounting said levers on said frame structure between the ends of said levers, and links interconnected between the respective ends of said levers and said yoke and said second jaw.

13. In apparatus as defined in claim 1, said means pivotally mounting said upper gripping assembly on said lower gripping subassembly including mating cylindrical walls on said subassemblies, and means for preventing axial separation of said cylindrical walls.

14. In apparatus as defined in claim 1, said means pivotally mounting said upper gripping assembly on said lower gripping subassembly including mating cylindrical walls on said subassemblies, means for preventing axial separation of said cylindrical walls, and said means for relatively pivotally moving said upper gripping subassembly and said lower gripping subassembly includes a lever projecting laterally from one of said cylindrical walls and an actuator cylinder and rod, said cylinder being connected to one and said rod being connected to the other of said lever and one of said gripping subassemblies.

15. In apparatus as defined in claim 1, said means pivotally mounting said upper gripping assembly on said lower gripping subassembly including mating cylindrical walls on said subassemblies, means for preventing axial separation of said cylindrical walls, and means to prevent cocking of said subassemblies on said means pivotally mounting said upper gripping subassembly on lower gripping subassembly, including an arcuate rail on one of said subassemblies spaced from said cylindrical walls, and plate means on the other of said subassemblies overlying said arcuate rail.

PO-1050
(5/69)

UNITED STATES PATENT OFFICE
CERTIFICATE OF CORRECTION

Patent No. 3,629,927   Dated December 28, 1971

Inventor(s) Melvin J. Palmer et al

It is certified that error appears in the above-identified patent and that said Letters Patent are hereby corrected as shown below:

Col. 1, line 14, "signal" should be --single--.
Col. 2, line 8, delete "or the Kelly saver sub forming a part of the Kelly,"
         line 26, "shiftably" should be --shiftable--.
Col. 5, line 8, after "in" insert --Fig. 2, for example, and the angularly shifted position shown in--.
Col. 5, line 22, "is", first occurrence, should be --and--
Col. 7, line 55, "or" should be --of--.
         line 66, after "links" insert --133--.
Col. 8, lines 5 and 6, delete "It will be noted, however, that the subassemblies are similar.".
Col. 10, line 25 (Claim 9), "said" should be --a--.

Signed and sealed this 26th day of September 1972.

(SEAL)
Attest:

EDWARD M. FLETCHER, JR.          ROBERT GOTTSCHALK
Attesting Officer                Commissioner of Patents